US005459192A

United States Patent [19]
Green et al.

[11] Patent Number: 5,459,192
[45] Date of Patent: Oct. 17, 1995

[54] THERMALLY REVERSIBLE GELS IN LIQUID MEDIA

[76] Inventors: Mark M. Green, 174 W. 76th St., Apt. 5G, New York, N.Y. 10023; Otto Vogl, 349 Oxford Rd., New Rochelle, N.Y. 10804

[21] Appl. No.: 239,694

[22] Filed: May 9, 1994

Related U.S. Application Data

[63] Continuation-in-part of Ser. No. 106,216, Aug. 13, 1993, abandoned.
[51] Int. Cl.⁶ .................................................... C08K 5/01
[52] U.S. Cl. ........................................... 524/474; 524/589
[58] Field of Search ...................................... 524/474, 589

[56] References Cited

U.S. PATENT DOCUMENTS 3,810,860  5/1974  Doyle ..................................... 524/474
5,132,355  7/1992  Nahlovsky ............................. 524/474

Primary Examiner—Kriellion S. Morgan
Attorney, Agent, or Firm—Hayes, Soloway, Hennessey, Grossman, & Hage

[57] ABSTRACT

Thermally reversible gels comprising liquid solvents wherein the solvent is converted into a thermally reversible gel upon the addition of a rigid polymer, preferably, a liquid crystal forming polymer. Structural modifications of the rigid polymer, and in particular modifications of the side-chain, adapt the rigid polymer to form thermally reversible gels in any given solvent media.

22 Claims, 3 Drawing Sheets

THERMALLY REVERSIBLE GELS IN LIQUID MEDIA

BACKGROUND

This application is a continuation-in-part of U.S. application Ser. No. 08/106,216, filed Aug. 13, 1993, now abandoned.

There are many examples in which relatively dilute solutions of polymers under poor solvent conditions form thermally reversible gels. Although this phenomenon can be understood in general to arise from chain interactions which intercept microscopic phase separation it is often far from clear how the phase behavior relates to the gelation and also what exact structural mechanism exists to anchor the reversible crosslink points which are essential to the gel formation. See, e.g., P. J. Flory Faraday Discussions of the Chemical Society, 1974, 57(7); P. S. Russo in "Reversible Polymeric Gels and Related Systems" edited by P. S. Russo, ACS Symposium Series 350, 1987, Ch. 1; S. B. Ross-Murphy in "Polymer Gels, Fundamentals and Biomedical Applications" edited by D. DeRossi, K. Kajiwara, Y. Osada, A. Yamaguchi, Plenum Press, NY 1989, pp 21 ff; J. S. Tsau, J. P. Heller, G. Pratap, Thermally Reversible Organogels Of 12-Hydroxystearic Acid; Polymer Preprints, V. 35, No. 1, March 1994, pp 737–738. In fact, one noted review of this field has gone so far to point out that to date, no general theories have emerged to explain thermally reversible gel formation. See, e.g., "Thermoreversible Gelation of Polymers and Biopolymers", by Jean-Michel Guenet, Academic Press (1992).

Driven by its commercial importance the earliest well studied thermally reversible gel was gelatin in water where it was shown that profound optical activity changes signal the transition to the gel state. See, e.g., H. Morawetz "Macromolecules in Solution" Wiley-Interscience, 1975, pp 78–81 and C. R. Smith, J. Am. Chem Soc. 1919, 41, 135. This optical activity work was followed by many structural studies which finally revealed the precise chain-chain interactions leading to the reversible gel state.

Some earlier work by one of the inventors herein concerning poly(alkyl isocyanates) have led to the conclusion that such polymers, known to adopt a stiff helical conformation in solution, afford a highly temperature and solvent dependent optical activity. Such activity was shown by circular dichroism measurements to involve a surprising influence of tiny proportions of chiral monomer on the overall chain conformation. See, Green and Reidy, "Macromolecular Stereochemistry: The Out-of Proportion Influence of Optically Active Comonomers on the Conformational Characteristics of Polyisocyanates-The Sergeants and Soldiers Experiment", J. Am. Chem. Soc. 1989, 111, 6452–6454. This same disclosure also revealed, as a footnote, that a very particular optically active copolyisocyanate, apparently gave rise to a thermally reversible gel in n-hexane when present in an amount of greater than 5 mg/ml. This single copolymer was also reported to be a high molecular weight copolyisocyanate (Mv=670,000) of poly-n-hexyl isocyanate and (S)-(–)-2,2-dimethyl-1, 3-dioxolane-4-methylene isocyanate as the comonomer unit. Accordingly, this disclosure hinted at the possibility of thermally reversible gels in the single solvent of n-hexane, but was unclear as to the criticality of copolymer structure as well as optical activity towards obtaining thermally reversible gel formation, and in fact, called attention to polar types of copolyisocyanates (i.e., polyisocyanates with polar ring type branched structures) as the principal candidate to achieve thermally reversible gel formation in a non-polar medium.

Gels have also been observed from poly-n-butyl isocyanate in two aromatic solvents, benzene and toluene (see e.g., R. Olayo and W. G. Miller, J. Polym. Sci., Physics, 1991, 29 (1473)and reference therein).

One of the inventors herein also recently reported in an approximately 60 word abstract focused on dilute solution aggregates, which might be related to gelation at higher concentrations, that higher concentrations of unspecified molecular weight solutions of poly(n-hexyl isocyante) show thermally reversible gels at unspecified temperatures in hydrocarbon solvents of unspecified structure. See, "Thermally Reversible Gelatin of Poly(n-hexyl isocyante) in Hydrocarbon Solvents and the Bad Neighbor Theory", Green et al., Bulletin of the American Physical Society, March 1992, Vol. 37, No. 1, p. 415.

However, to date, none of the above disclosed, studied or recognized how to optimize the formation of thermally reversible gel formation by a consideration of, as now described, the combined effects of polymer side-chain structure, molecular weight, and concentration. Nor, and most importantly, have the above recognized the enormous utility of such a method for various commercial applications, such as, e.g., the control of flame spread in fires driven by hydrocarbon fuels or the control of hydrocarbon spills with environmental consequences.

Since general theories regarding thermally reversible gel formation have been elusive, to date, it is not surprising that there have been no systematic findings regarding, e.g., what type of polymer side-chain structures on a rigid polymer chain tend to produce thermally reversible gels in a given solvent, or how to change the rheological properties of the gel with and without changing polymer concentration, or how to alter the onset of gel temperature, in a given solvent, for a given polymer. Accordingly, the instant invention represents a consideration of such variables in poly(alkyl isocyanates) which are rigid polymers in which such variables can be uniquely controlled and provides therefore for the first time a rational technique for identifying and developing thermally reversible gels in a wide variety of organic solvent media.

Accordingly, it is a general object of this invention to monitor and establish the thermally reversible gel forming capability of rigid polymers in liquid media and to ascertain the variables that promote thermally reversible gel formation. Such polymers come in a wide variety of structures but all are characterized by the ability to form liquid crystals. For this invention these polymers must form dilute solutions in liquid solvents where the relatively poor solvent conditions allow temperature to cause the phase conditions necessary for the gel formation. One good example is the polypeptides such as alkyl substituted poly (δ-glutamic acids). Although alkyl substituted polypeptides are known structurally and form thermotropic liquid crystals they have not been studied as a class for their lyotropic characteristics. One example of the latter is the octadecyl ester of poly(δ-glutamic acid) and its copolymers. It is encouraging in this regard that poly (-benzylglutamic acid) forms thermally reversible gels in dimethylformamide and certain other solvents which dissolve it but which are not excellent solvents. These solvents though are not hydrocarbons. In accordance with the present invention, we find that long-chain hydrocarbon substituted esters of poly(δ-glutamic acid) are soluble in n-hexane and octane. The methods disclosed for identifying and developing thermally reversible gels now apply to such polymers.

It is a more specific object of this invention to establish the gel forming capability of the rigid polymers, e.g., polyisocyanates with a wide variety of hydrocarbon side chains which allow homo, co- or higher order polymerizations so as to mix side chain structure when necessary so as to promote gelation in a controlled range of hydrocarbon solvents, and to ascertain the variables that control reversible gel formation.

It is also an object of this invention to prepare thermally reversible gels from polyisocyanate polymers, containing aliphatic, branched aliphatic, and cycloaliphatic side chains, as polymers and as copolymers, terpolymers and higher orders, and to determine, e.g., the effect of side chain structure, molecular weight and polymer concentration that will give rise to gel formation in various hydrocarbon media.

It is also an object of this invention to utilize the reversibility of the gelation with temperature to control hydrocarbon flow and to utilize the thermal instability of the polyisocyanates to irreversibly convert the gel to the flowing solution state. On heating to greater than about 100° C. to 200° C. depending on structure, these polymers are converted to small molecules.

Finally, it is also an object of the present invention to describe a process for preparing the thermally reversible gels by the combination of polyisocyanate homopolymers with various hydrocarbon media under controlled conditions which favor thermally reversible gel formation.

SUMMARY OF THE INVENTION

This invention comprises thermally reversible gels comprising liquid solvents wherein the solvent is converted into a thermally reversible gel upon the addition of a rigid polymer, preferably, a liquid crystal forming polymer. Structural modifications of the rigid polymer, and in particular modifications of the side-chain, adapt the rigid polymer to form thermally reversible gels in any given solvent media.

In process form the invention comprises methods for identifying and developing a thermally reversible gel in liquid media comprising the steps of supplying a solvent, followed by the addition of a sufficient amount of a rigid or wormlike polymer to said solvent, as is exemplified by the polyisocyanate polymer, wherein the side-chain structure of the polymer, the molecular weight of the polymer, and the concentration of the polymer are controlled not only to provide thermally reversible gel formation but also to control the sol-gel temperature of the transition. By the term rigid polymer, it is meant to include polymers that will form liquid crystals in solution (the so-called lyotropic liquid crystalline polymers), as well as polymers that form liquid crystals upon heating (the so-called thermotropic liquid crystalline polymers). In either case, and in accordance with the present invention, it has been found that as long as this basic rigidity, or liquid crystal forming capability is maintained, structural modifications can now be installed in such polymers which lead to thermally-reversible gel formation in various liquid media.

In the case of thermotropic liquid crystals, it should be made clear that although such polymers are generally insoluble, such polymers can now be adapted to not only promote liquid solubility, but to promote, as noted, thermally-reversible gel formation. This is uniquely achieved by modifying the structure of such polymers to promote both solubility, and gel-forming capability, without destructions of the basic mesogenic character of the polymer chain.

More particularly, this invention comprises methods for developing thermally reversible gels comprising polyisocyanate polymers in combination with aliphatic hydrocarbon solvents. The polyisocyanate polymers are substituted with linear aliphatic, branched aliphatic, or cycloaliphatic side chains or mixtures of all these types.

The molecular weight and concentration of the polyisocyanate polymer, as well as the type of substitution on the polyisocyanate polymer chain, all combine to control the onset, i.e. temperature of gel formation in a given aliphatic hydrocarbon solvent, in addition to the rheological properties of gel formed (e.g., the relative viscosity of the gel, or the stability of the gel viscosity upon application of increased shear). The side chain structure in particular will control the solubility of the polyisocyanate in various hydrocarbons and this is a prerequisite to gel formation. In addition, lowering of molecular weight, for example, below a certain critical value, removes the onset of gel formation, while an increase in molecular weight results in a stronger gel (again, a higher viscosity gel). At constant but high enough molecular weight, low concentrations of polymer, i.e., concentrations below a critical level, restrict gel formation, but do reveal polymer aggregation in solution ultimately responsible for gelation. The precise concentration for gel formation, and the precise temperature for gel formation, varies amongst different hydrocarbon solvents. Finally, the molecular weight of the polyisocyanate, in addition to having some effect on the critical concentration required for gelation, may also affect the temperature at which gel formation occurs.

In accordance with the above, poly(n-hexyl isocyante) (PHIC), a typical worm-like polymer with locally rigid features and therefore an example of the class of polymers of this invention, of about 200,000–300,000 viscosity average molecular weight, at a concentration of about 5 mg/ml, has been found to form a thermally reversible gel in the following hydrocarbon solvents: n-hexane, n-heptane, n-octane, 2-methylpentane, 2,2-dimethyl butane, 2,3,4-trimethylpentane, 2,2-dimethylhexane and 2,5-dimethylhexane, 2,3 dimethylbutane, 3-methylpentane, and 2-methylkeptane. Copolymers of n-hexyl isocyanate with branched hydrocarbon side chains such as 2,6-dimethylheptyl and 3,7 dimethyloctyl isocyanate as well as homopolymers of these latter two branched isocyanates also form gels in non-polar solvents such as n-hexane. This demonstrates the variability of the side chain structure which has never been disclosed. Such variability is one important aspect of this invention as discussed above.

The above noted variability can be seen, for example, when using "Pacoa" triple distilled kerosene as a hydrocarbon solvent. Whereas poly(n-hexyl isocyanate) of weight average molecular weight 283,000 at a concentration of 5 mg/ml will only gel the kerosene at about −20° C., poly (nonyl isocyanate) of near to the same degree of polymerization, at 5 mg/ml, forms a thermally reversible gel at 0° C. within 30 minutes. Moreover, whereas the poly(hexyl isocyanate) solution described above will not gel at any temperatures higher than about −20° C., the poly (nonyl isocyanate) solution described above will form a gel at 42° C. in 24 hours, or at room temperature in 2 hours. These gels return to the sol state very quickly at near to 70° C. We have also discovered that varying the concentration of the poly(nonyl isocyanate) solution in kerosene affects the gelation. For example, 1.5 mg/ml will not gel above 0° C. When one considers that the kerosene described above is closely related to jet fuel one can see the practical nature of this result for forming a safe fuel in a gel form which can be reversibly returned to the sol state.

Finally, a further aspect of the present invention comprises a thermally reversible gel comprising a hydrocarbon solvent wherein the hydrocarbon solvent is converted into a gel upon the addition of a rigid polymer whose side chain structure, molecular weight and concentration are adjusted to provide thermally reversible gel formation, and wherein the gel is converted back to the solution state and said rigid polymer contained in said gel is converted to a low molecular weight compound, upon appropriate selection of temperature.

DETAILED DESCRIPTION OF THE INVENTION

Figure 1:
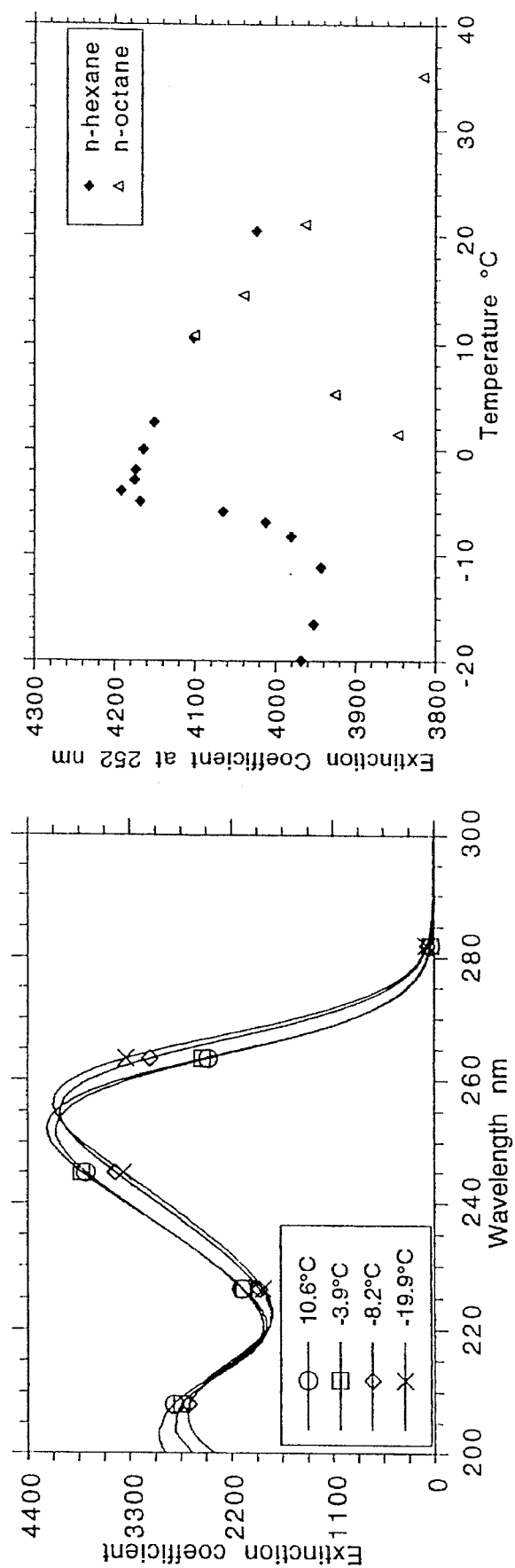
FIG. 1 shows the extinction coefficient against temperature for the UV band for PHIC copolymer.

Following Ferry's definition of a gel as quoted by Russo, P. S. Russo ("Reversible Polymeric Gels and Related Systems" edited by P. S. Russo, ACS Symposium Series 350, 1987, Ch. 1) we have found that a 5 mg/ml clear apparently true solution of a sample of PHIC (300,000 $M_v$) in the following hydrocarbons in a sealed tube formed a gel when stored for several days in a freezer at −20° C. In this state, no flow was observed although in some cases clear solvent was apparently excluded as temperature increased but still below the sol state. A 520 mg magnetic stirring bar could not be moved by gravity or by the movement of a similar magnet outside the sealed tube. The gel forming hydrocarbons are: n-hexane; n-heptane; n-octane; 2-methylpentane; 2,2-dimethylbutane; 2,3,4-trimethyl pentane; 2,2-dimethylhexane; 2,5-dimethylhexane; 2,3 dimethylbutane; 3-methylpentane; and 2-methyl heptane. Cis and trans decalin and 1 and 2-chlorobutane gave no evidence of gel formation or cloudiness while inconsistent observations of "gelatinous cloudy properties" were seen in: 1-chlorohexane; 1-chloroheptane. Significantly we see gel formation for the branched side chain homopolymer of 3,7-dimethyloctyl isocyanate at lower concentrations in n-hexane than for poly(n-hexyl isocyanate). The molecular weight of the polymer also plays a role here.

On warming, the various gels returned to the clear solution state at various temperatures with only n-octane; n-heptane; 2-methylpentane; 2,2-dimethylhexane and 2,5-dimethylhexane maintaining gel properties (with considerable sol) on longstanding at room temperature. On further warming the true sol state is obtained in these solvents and this sol state is prerequisite for return to the cohesive gel on re-cooling.

Although, as noted above, a general theory for gel formation has not yet been established, and in no way effects the findings disclosed herein, it is believed that certain experiments can assist in understanding reversible gel formation in the polyisocyanate-hydrocarbon solvent system and therefore in other rigid or worm-like appropriately soluble polymer such as the alkyl substituted polypeptides, for one example, as discussed above in this disclosure. As seen below, the connection of the polyisocyanates, in particular here, to a specific phase diagram first described by P. Flory (see below) makes it certain that many polymers described by this phase diagram, i.e. rigid or stiff polymers, will also cause thermally reversible gelation in hydrocarbon solvents when their side chain structure, if allowed, is appropriately adjusted by alkyl substitution.

Experiments discussed below on spectroscopic changes may be insightful concerning the chain-chain and chain-solvent interactions in these gels. Such experiments though may not be helpful in understanding the many other thermally reversible gels which have been reported which are not of the stiff polymer type (J. M. Guenet, "Thermally Reversible Gelation of the Polymers and Biopolymers." Academic Press, N.Y. 1992).

The temperature dependent UV spectra in very dilute solutions for the same PHIC sample used for the gel work in all the solvents listed above revealed a sudden reproducible shift in the long wavelength backbone conjugation band at temperatures which do not match but do parallel the temperature necessary to form the gel., i.e., gels stable at higher temperatures exhibit a UV shift at higher temperatures. Representative data for this UV effect are seen in FIG. 1 for n-hexane for PHIC of an appropriate molecular weight. Although the direction of the $\lambda_{max}$ shift is from dissolved PHIC to the film, in these dilute solutions there is no evidence above or below the critical temperature for any phase separation by eye or by a reduction in the light intensity as measured by the spectrometer.

Figure 2:
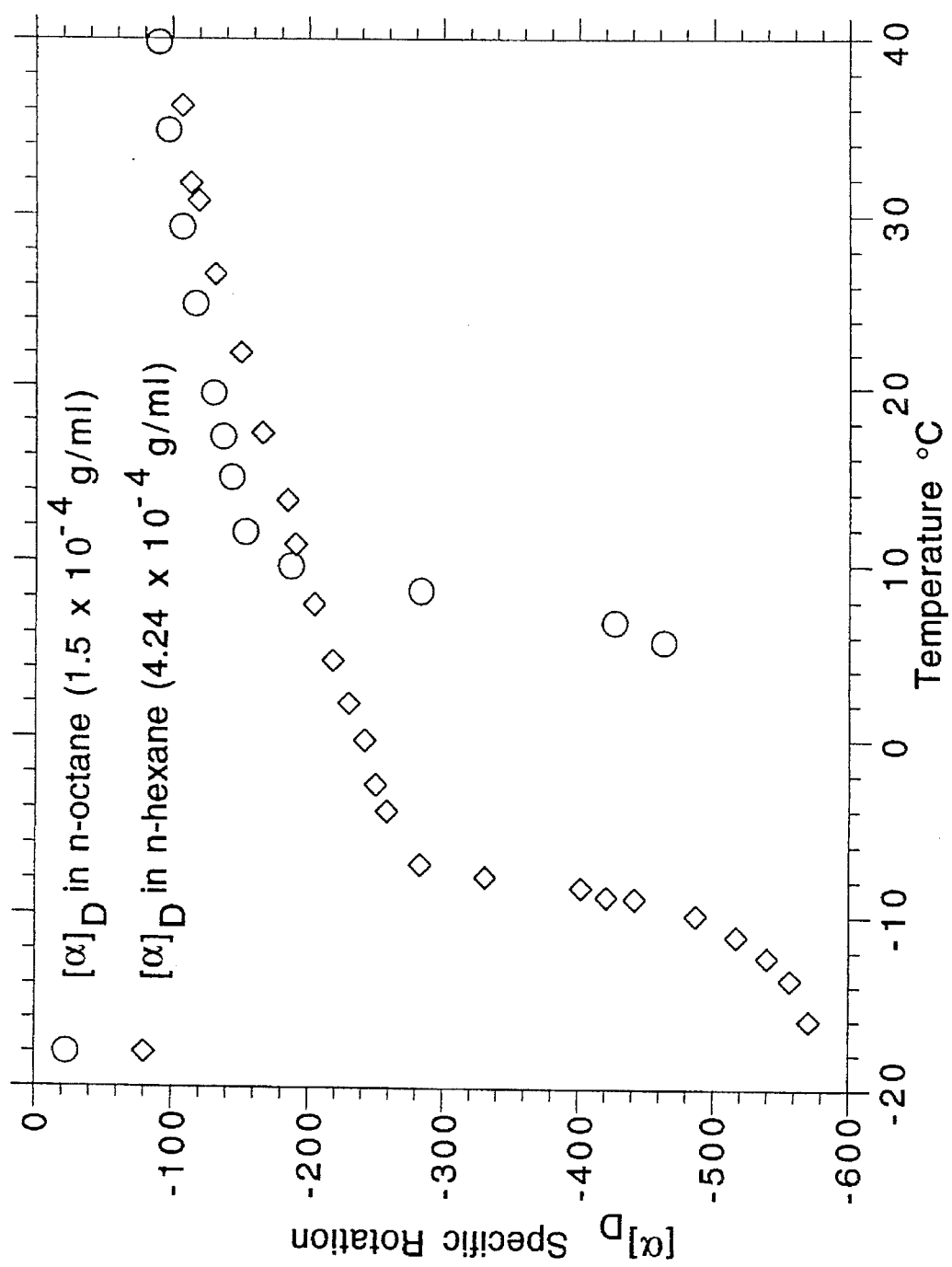
FIG. 2 shows optical rotation v. temperature for a copolymer of 99.5% n-hexyl isocyante and 0.5% (R)-2,6-dimethyl heptyl isocyante.

A further clue comes from study of the optical activity of a random copolymer prepared from 1% (R)-2,6-dimethylheptyl isocyanate and 99% of n-hexyl isocyanate. An identical result arises from a copolymer with 0.1% and 99.9% of these comonomers. These copolymers at 5 mg/ml in n-hexane or in n-octane show the same gel formation characteristics as PHIC discussed above but a study of their optical activities either by polarimetry or by circular dichroism spectrometry show a strong increase to large negative values at the identical temperature of the UV shift. FIG. 2 exhibits this effect for the 99/1 copolymer in both n-hexane and n-octane. Moreover, the optical rotation at which the effect levels off (FIG. 2) is near to the maximum rotation possible for a single helical sense of PHIC.

Figure 3:
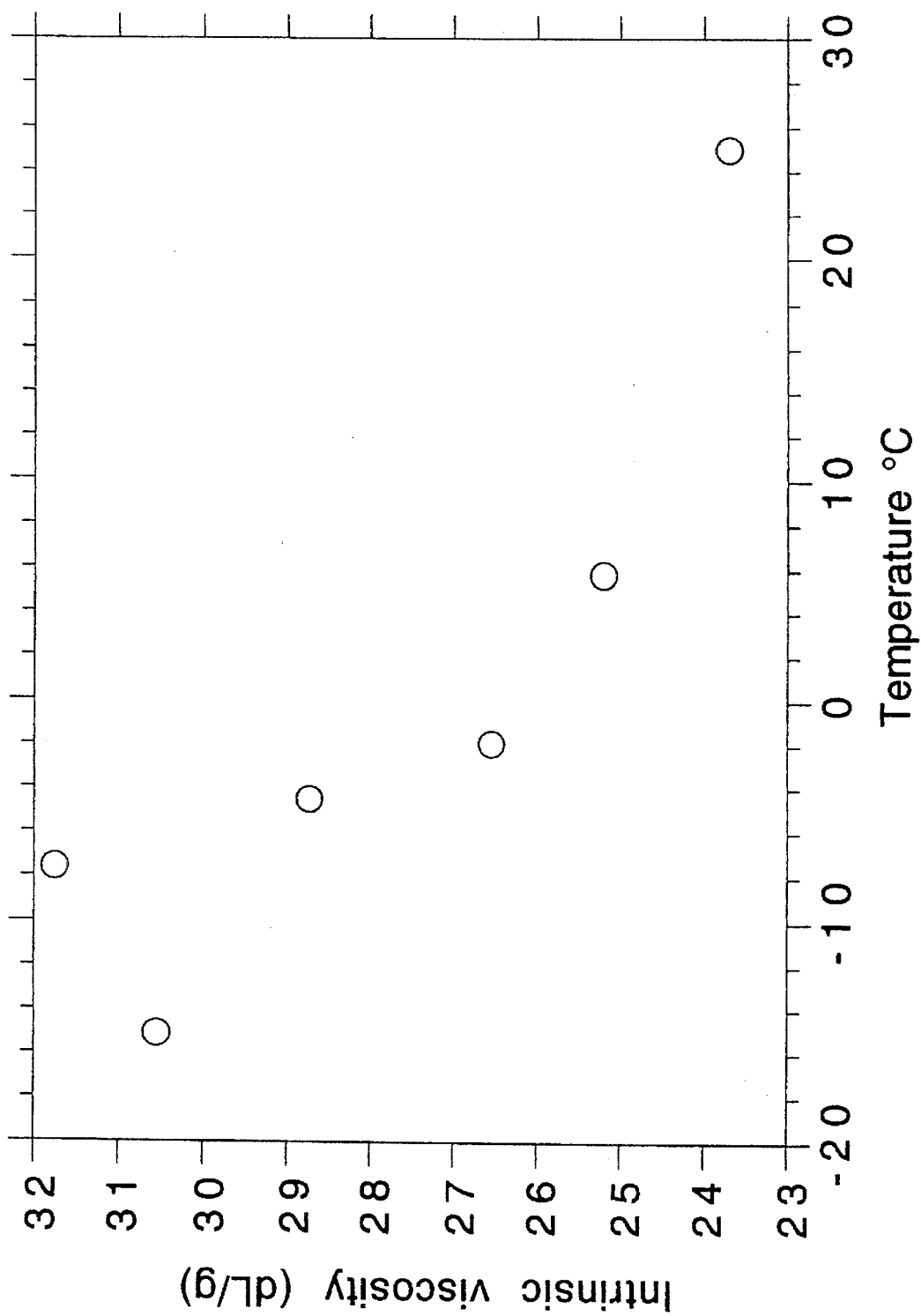
FIG. 3 shows intrinsic viscosity v. temperature for a poly-n-hexyl and branched hydrocarbon isocyante copolymer.

The UV and optical activity temperature dependence (FIGS. 1 and 2) can be shown theoretically by connections to "Flory's phase diagram and to the Khokhlov-Semenov theory" to suggest a sudden aggregation driven by crossing a phase boundary into the broad biophasic LC-isotropic region of the Flory phase diagram at low temperature. Such an effect is not unreasonable for a stiff polymer even at very low concentrations and is supported by the intrinsic viscosity temperature data shown in FIG. 3 for the 98/2 copolymer. A. R. Khokhlov in Ch.3 and A. Abe and M. Ballauft in Ch.4 of "Liquid Crystallinity in Polymers, Principles and Fundamental Properties," A Ciferri, editor, VCH Publ. 1991; A. R. Khokhlov and A. N. Semenov, *Macromolecules.*, 1984, 17, 2678). These arguments (see below) are made in detail in: M. M. Green, C. A. Khatri, M. P. Reidy, K. Levon, *Macromolecules*, 1993, 26, 4723.

If the aggregate structure involves a nematic-like side by side arrangement of the worms one could understand the optical activity properties since this property is intensity limited by helix reversals. Such angular "defects" can be easily seen as bad neighbors to a side by side aggregation, and their easy movement along the chain would allow their exclusion and therefore an extension of the favored helical sense. Moreover the $\lambda_{max}$ of PHIC is known to be sensitive to even slight changes in solvent polarity and it would therefore not be surprising that exclusion of solvent would shift this UV parameter.

The discussion above shows that this invention is not limited to the poly(alkyl isocyanates) and is applicable in any rigid polymer described by this phase diagram (see above). Therefore, this invention allows the adoption by structural change of any rigid or stiff polymer, as long as the change does not remove the stiffness, to cause appropriate solubility in liquid solvents. On changing the conditions such as by temperature, so as to cause the solvent to be a poorer solvent, we can expect the formation of a thermally reversible gels, as we find in the polyisocyanates discussed here which are a typical example of such a stiff polymer. In support of this poly(octadecyl-1-glutamate), which is a stiff backbone polymer, at molecular weight of 96,000, forms thermally reversible gels at 0° C. for 5 mg/ml solutions in n-hexane or n-octane or Pecora Kerosene.

EXAMPLE I

Syntheses and characterizations of the optically active co-polyisocyanates are described in M. M. Green, M. P. Reidy, R. D. Johnson, G. Darling, D. O'Leary, G. Willson, J. Am. Chem. Soc. 1989, 111, 6452. Poly(n-hexyl isocyanate) is also described in this communication although it was first described earlier (V. E. Shashoua, W. E. Sweeney, R. F. Tietz, The Homopolymerization of Monoisocyanates, *J. Amer. Chem. Soc.*, 82, 866–873 (1960). All solvents were purchased from Alrich Chemical Co. and were checked for purity and structure by using gas chromatography and $^{13}C$ NMR spectroscopy (on JEOL FX90Q FTNMR). Cis and trans decalin, which had some absorption in the UV region were further purified as mentioned in "Purification of Laboratory Chemicals" by D. D. Perrin, W. L. F. Armargeo 3rd Ed. Pergamon Press. 1988. The following standard procedure was used to prepare solutions for all the gel experiments: 10 mg of polymer was transferred into a heavy wall glass tubing containing an oval shaped stirrbar which weighed 520 mg. 2 cc of solvent was transferred and then the tube was sealed under vacuum after removing dissolved gas by freeze drying with liquid nitrogen several time. To facilitate the dissolution of polymer, tubes were heated on a water bath at 50° to 55° C. and stirred vigorously on a vortex shaker. After the solution became transparent, the tube was allowed to shake for a further 3 to 4 hrs or overnight in some cases. All tubes were then kept in a refrigerator which could attain a temperature of −20° C. Observations were made visually by looking at the movement of the magnet and the clarity of the solution as discussed above.

UV and circular dichroism spectra and optical rotatory dispersion measurements were carried out on the dilute solutions on a Varian Cary 2300, AVIV 60DS or 62DS spectrophotometer and on a Perkin-Elmer 141 spectropolarimeter respectively.

UTILITY

As disclosed herein, thermally reversible gel formation can now be optimized for rigid rod polymeric structures formed by polymerization of. e.g., alkyl isocyanates, and more generally, any rigid or stiff polymer chain. The rigidity of the polymers used will allow the formation of these thermally reversible gels at low concentrations of the polymers so as to decrease expense (cost of polymers used) and not interfere with the primary function of the hydrocarbon. In addition, the rigidity of the polymer which is directly connected to the low concentration necessary for thermally reversible gel formation distinguishes this invention from thermally reversible gels formed from flexible polymers, e.g., polystyrene. These gels form in hydrocarbon solvents, and it is possible to promote gel formation, e.g., at different concentrations, and at different temperatures. The variables of molecular weight and polymer side-chain structure are seen to control thermally reversible gel formation in this system and these variables are readily controlled in these polymers.

The ability to create thermally reversible gels in hydrocarbon solvents, or in particular, liquid hydrocarbon fuels, provides an extremely effective method for controlling the physical character of hydrocarbon fuels along with extraordinary implications with respect to their ability to restrict the damaging effects of such fuels in a given crisis situation. For example, hydrocarbons can now be converted into a much less dangerous form, a gel, which would minimize their ability to spread if, upon accident, they were to escape from a containment vehicle. However, upon appropriate selection of temperature, as disclosed herein, (i.e. by thermally reversing the gel in general by temperature change or by depolymerization, e.g., of the polyisocyanate to trimer structure) these gels can be reconverted back to a free-flowing fluid, and be delivered in the manner made necessary by a particular combustion mechanism.

Furthermore, when large quantities of hydrocarbons are shipped, the risk of environmental contamination can now be minimized, as gels can now be rationally developed for such hydrocarbons on a predictable basis, and accordingly, such gels would not release as quickly into the environment in the event of leakage or the complete rupture of a storage tank when in transport. The implication of minimizing, or even eliminating the risks involved in petroleum shipment transport, for example, is extraordinary.

Those skilled in the art will recognize or be able to recognize, by no more than routine experimentation, many equivalents of the specific embodiments of the invention described herein. Such equivalents are intended to be encompassed by the following claims.

What is claimed is:

1. A process for identifying and developing a thermally reversible gel in liquid media comprising the steps of:
   a. supplying liquid solvent:
   b. adding a sufficient amount of a rigid polymer to said solvent, wherein the side-chain structure of the polymer, the molecular weight of the polymer, and the concentration of the polymer are controlled to provide thermally reversible gel formation.

2. The process of claim 1 wherein the solvent is selected from the group consisting of: n-hexane, n-heptane, n-octane, 2-methylpentane, 2,2-dimethyl butane, 2,3,4-trimethylpentane, 2,2-dimethylhexane and 2,5-dimethylhexane, 2,3-dimethylbutane, 3-methylpentane, 2-methylheptane, kerosene, petroleum based hydrocarbons, and mixtures thereof.

3. The process of claim 1 wherein the rigid polymer is poly-n-hexylisocyanate.

4. The process of claim 1 wherein the rigid polymer is a polypeptide or copolypeptide with alkyl substitution.

5. The process of claim 4 wherein poly-n-hexylisocyanate is present at a concentration of about 5 mg/ml.

6. The process of claim 1 wherein the structure of the side chain, molecular weight, and polymer concentration are further adjusted to alter the temperature of reversible gel formation.

7. A thermally reversible gel comprising a liquid solvent wherein the solvent is converted into a thermally reversible gel upon the addition of a rigid polymer wherein the side-chain structure of the polymer, the molecular weight of the polymer, and the concentration of the polymer are adjusted to provide thermally reversible gel formation.

8. The thermally reversible gel of claim 7 wherein the solvent is a petroleum based hydrocarbon.

9. A thermally reversible gel comprising a liquid solvent wherein the solvent is converted into a gel upon the addition of a rigid polymer whose side chain structure, molecular weight and concentration are adjusted to provide thermally reversible gel formation, and wherein the gel is converted back to the solution state and said rigid polymer contained in said gel is converted to a low molecular weight compound upon appropriate selection of temperature.

10. The thermally reversible gel of claim 9 wherein the liquid solvent is a hydrocarbon solvent.

11. A method for controlling the flow characteristics of hydrocarbon fuels comprising supplying a hydrocarbon fuel and adding to said hydrocarbon a sufficient amount of a rigid polymer wherein the side chain structure of the polymer, molecular weight of the polymer, and the concentration of the polymer are controlled to provide thermally reversible gel formation.

12. A thermally reversible gel comprising a hydrocarbon fuel in combination with a rigid polymer wherein the side chain structure, molecular weight of the polymer, and the concentration of the polymer are controlled to provide thermally reversible gel formation.

13. A thermally reversible gel comprising kerosene and poly(n-hexyl isocyanate) at a concentration of about 5 mg/ml wherein said gel forms at about −20° C.

14. The thermally reversible gel of claim 13 wherein the poly(n-hexyl isocyante) has a weight average molecular weight of about 280,000.

15. A thermally reversible gel comprising kerosene and poly(nonyl isocyante) wherein said gel forms at about 0° C. at a concentration of about 5 mg/ml.

16. The thermally reversible gel of claim 15 wherein the poly (nonyl isocyanate) has a weight average molecular weight of about 335,000.

17. A thermally reversible gel of poly(octadecyl-1-glutamate) of molecular weight 96,000 wherein said gel forms about 0° C. in n-hexane, n-octane or Pecora Kerosene.

18. A process for identifying and developing a thermally reversible gel in liquid media comprising the steps of:
   a. supplying liquid solvent selected from the group consisting of: n-hexane, n-heptane, n-octane, 2-methylpentane, 2,2-dimethylbutane, 2,3,4-trimethylpentane, 2,2-dimethylhexane and 2,5 dimethylhexane, 2-3-dimethylbutane, 3-methylpentane, kerosene, petroleum based hydrocarbons, and mixtures thereof.
   b. adding a sufficient amount of a rigid polymer to said solvent, wherein the side-chain structure of the polymer, the molecular weight of the polymer, and the concentration of the polymer are controlled to provide thermally reversible gel formation.

19. A process for identifying and developing a thermally reversible gel in liquid media comprising the steps of:
   a. supplying liquid solvent
   b. adding a sufficient amount of poly-n-hexylisocyanate to said solvent, wherein the side-chain structure of the polymer, the molecular weight of the polymer, and the concentration of the polymer are controlled to provide thermally reversible gel formation.

20. A process for identifying and developing a thermally reversible gel in liquid media comprising the steps of:
   a. supplying liquid solvent
   b. adding a sufficient amount of a polypeptide or copolypeptide with alkyl substitution to said solvent, wherein the structure of the alkyl substituent, the molecular weight of the polymer and the concentration of the polymer are controlled to provide thermally reversible gel formation.

21. A process for identifying and developing a thermally reversible gel in liquid media comprising the steps of:
   a. supplying liquid solvent
   b. adding poly-n-hexylisocyanate at a concentration of about 5 milligrams/milliliters, wherein the side chain structure of the poly-n-hexylisocyanate and the molecular weight of the poly-n-hexylisocyanate are controlled to provide thermally reversible gel formation.

22. A process for identifying and developing a thermally reversible gel in liquid media comprising the steps of:
   a. supplying liquid solvent
   b. adding a sufficient amount of a rigid polymer to said solvent, wherein the side-chain structure of the polymer, the molecular weight of the polymer, and the concentration of the polymer are controlled to provide thermally reversible gel formation
   c. wherein the structure of the side-chain, molecular weight, and polymer concentration are further adjusted to alter the temperature of reversible gel formation.

* * * * *